Jan. 31, 1956 H. E. DE PENNING 2,732,959
DISCHARGE ELEVATOR FOR A HARVESTING MACHINE
Filed July 16, 1952 2 Sheets-Sheet 1
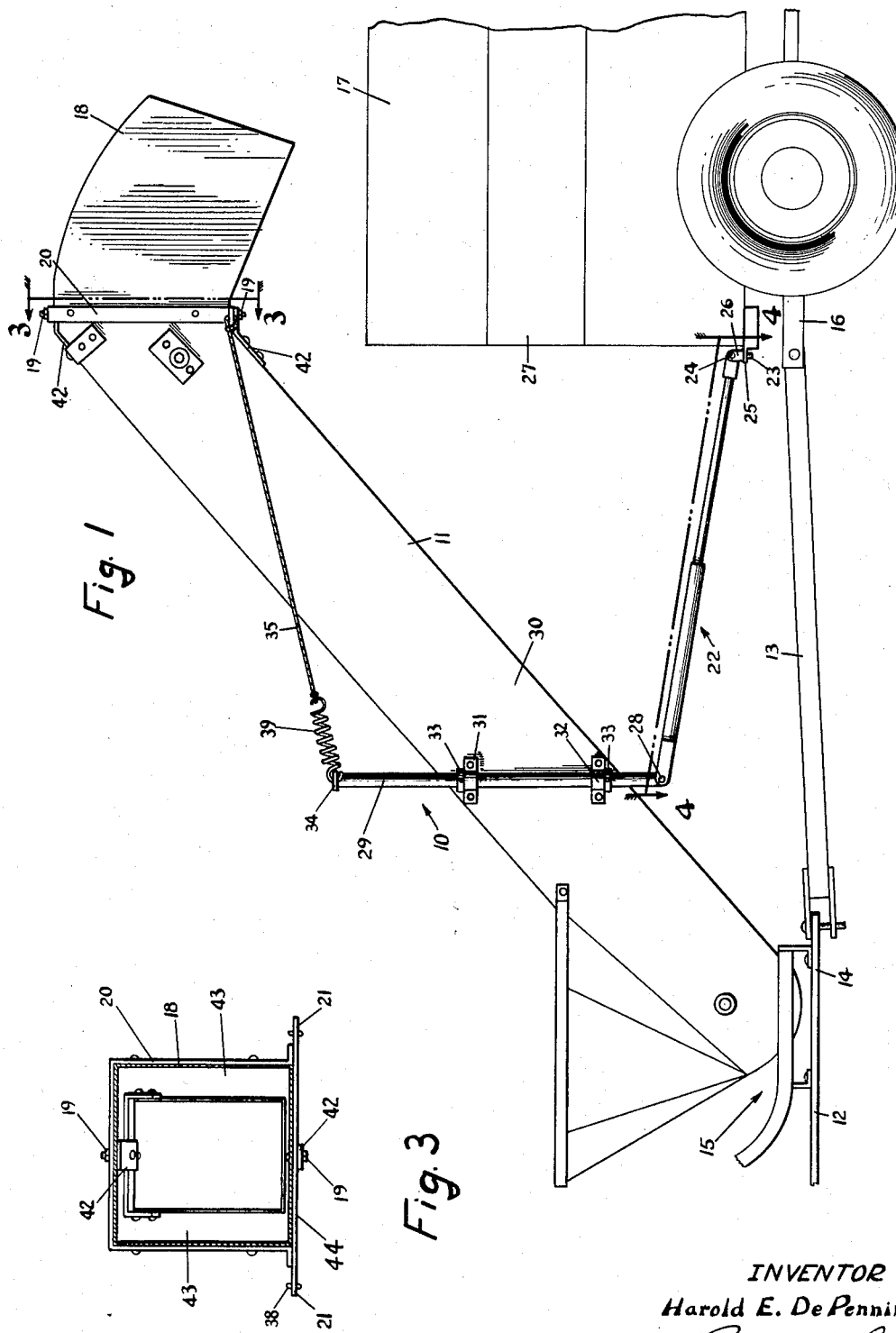
INVENTOR
Harold E. De Penning
By
Atty.

Jan. 31, 1956  H. E. DE PENNING  2,732,959
DISCHARGE ELEVATOR FOR A HARVESTING MACHINE
Filed July 16, 1952  2 Sheets-Sheet 2
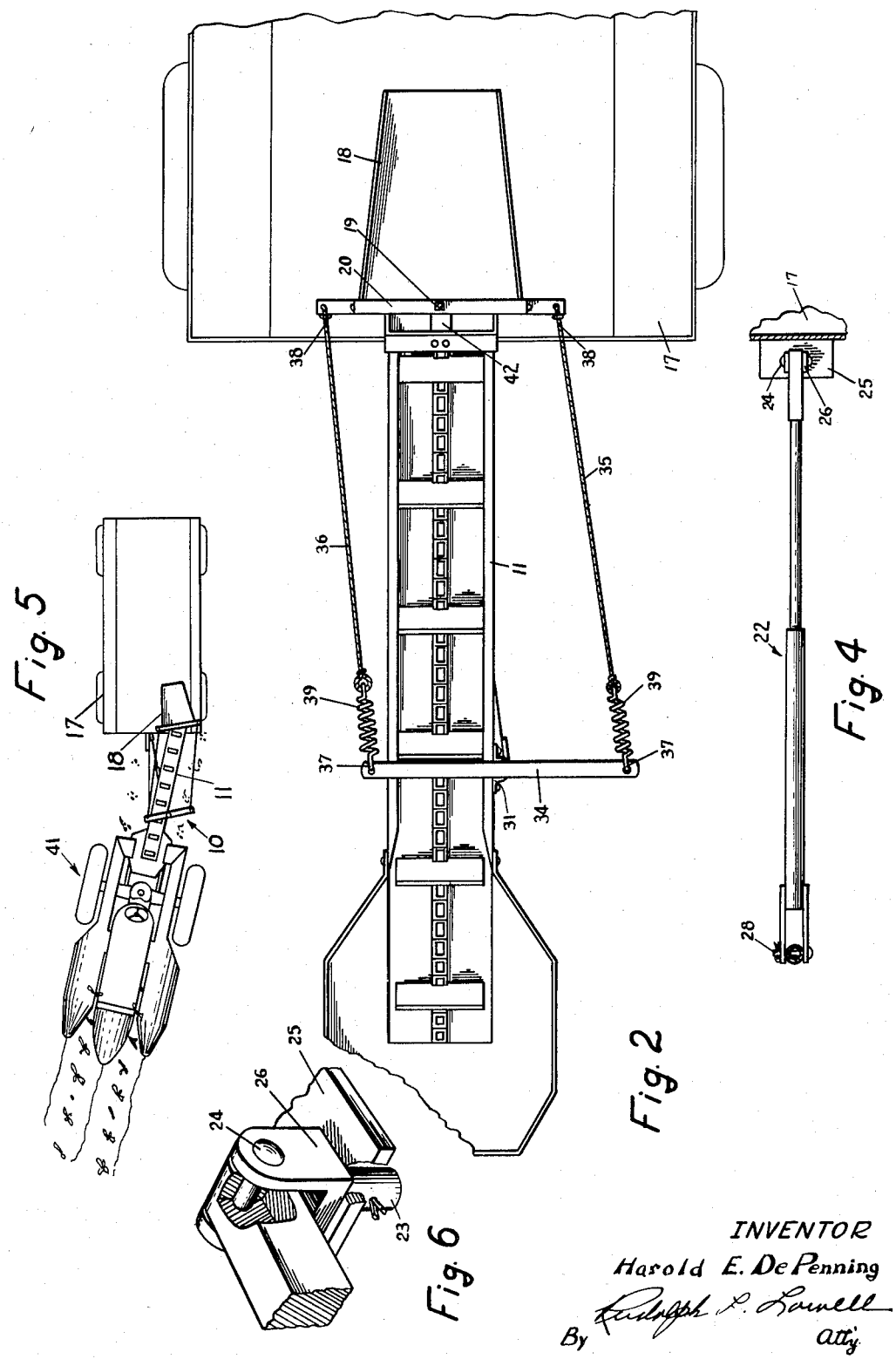
INVENTOR
Harold E. De Penning
By [signature]
Atty.

United States Patent Office 2,732,959
Patented Jan. 31, 1956

2,732,959

DISCHARGE ELEVATOR FOR A HARVESTING MACHINE

Harold E. De Penning, Reasnor, Iowa

Application July 16, 1952, Serial No. 299,203

1 Claim. (Cl. 214—42)

This invention relates generally to harvesting machines and more particularly to a control apparatus for the elevator of a corn picking machine which is adapted to direct corn from the elevator into a trailing wagon during a turning movement of the machine.

It is an object of this invention to provide an improved apparatus for maintaining the discharge hood of the elevator of a corn harvesting machine over the top of a trailing wagon during a turning movement of the machine.

Another object of this invention is to provide a device capable of being attached to the elevator of a corn picking machine for automatically pivoting the elevator discharge hood in response to a turning movement of the corn picker.

A further object of this invention is to provide a control structure which can be readily attached to the elevator of a corn harvesting machine for pivotally moving the elevator discharge hood in the direction of the turn of the corn harvesting machine.

A still further object of this invention is to provide a control apparatus for the discharge hood of an elevator which is of a simple, compact construction, economical to manufacture, easy to install, and readily applicable to elevators now used on present commercial type corn harvesting machines.

Further obejcts, features and advantages of this invention will be apparent from the following description when taken in connection with the accompanying drawing in which:

Fig. 1 is a side elevational view of an elevator for a corn harvesting machine showing the control structure of this invention in assembly relation with the elevator and a trailing wagon for the machine;

Fig. 2 is a top plan view of the assembly illustrated in Fig. 1;

Fig. 3 is a sectional view of the elevator discharge hood taken along the line 3—3 in Fig. 1;

Fig. 4 is a sectional view of the telescopic unit which is a part of the control structure of this invention as seen on the line 4—4 in Fig. 1;

Fig. 5 is a diagrammatic plan view illustrating the relative positions of the elevator and the control structure of this invention during a turning movement of the harvesting machine; and Fig. 6 is a detail perspective view of the pivotal connection between the telescopic unit and wagon embodied in the control structure of this invention.

With reference to the drawing, the control structure of this invention, indicated generally at 10, is shown in Fig. 1 applied to a usual elevator 11 which is rigidly attached to the frame 12 of a corn harvesting machine, only a rear end portion 15 of which is illustrated. A draft tongue 13 is pivotally connected to the draw bar 14 of the harvesting machine and the usual hound structure 16 on a wagon 17 of flare box type. The elevator 11 is inclined upwardly and rearwardly from the harvesting machine and is provided at its upper end with a horizontally movable discharge hood or spout 18 which is located above the wagon 17 and the movement of which is controlled by the control structure 10.

The discharge hood 18 (Figs. 1 and 3) is of the usual construction for directing corn from the elevator 11 into the wagon 17 and includes an upright frame structure 20 of an inverted U-shape, which is suitably secured about the forward end of the hood 18. Welded or otherwise securely attached to the open lower end of the frame structure 20 is a bracket member 44. The frame structure 20 and bracket member 44 are pivotally attached to a pair of mountings 42 on the rear end of the elevator 11 by vertical pivot members such as the bolts 19. The hood 18 is constructed so as to be of a larger cross sectional area than the elevator 11 to provide clearance spaces 43 between the adjacent sides of the hood 18 and elevator 11. The hood 18 is thus capable of a free horizontal swinging movement about the pivot members 19.

The control structure 10 (Figs. 1 and 4) consists of a telescopic unit 22 which extends longitudinally between the elevator 11 and the wagon 17 at a position above the draft tongue 13. The rear end of the telescopic unit 22 is attached to a bracket 26 (Fig. 6) by means of a horizontal pivot member 24. The bracket 26 carries an upright pin 23 at its lower end which is received in a mounting 25 secured to the front end 27 of the wagon 17. The rear end of the telescopic unit 22 is thus pivoted for up and down movement about the pivot member 24 and for swinging movement about the vertical pin 23. The front end of the telescopic unit 22 is pivoted on a horizontal bolt 28 carried in the bottom end of an upright shaft 29 which is rotatably supported in bearing straps 31 and 32 secured to a vertical side 30 of the elevator 11. The shaft 29 is held against up and down axial movement by a pair of stop collars 33 which are mounted about the shaft 29 at positions above the top bearing 31 and below the bottom bearing 32. Welded or otherwise rigidly attached to the top of the shaft 29 is a horizontal bar member or control rod 34 extended transversely of the elevator 11.

A pair of flexible members 35 and 36, such as wire, cables or the like, are secured at their forward ends 37 to the opposite ends of the control rod 34 (Figs. 1 and 2) and at their rear ends 38 to the ends 21 of the bracket member 44 arranged on the frame structure 20 of the hood 18. To facilitate the connection of the flexible members 35 and 36 to the control rod 34 and to maintain the flexible members 35 and 36 under tension at all times, a spring 39 is connected to each flexible member 35 and 36 and control rod 34.

In the operation of the control structure 10, assume that the corn harvesting machine which carries the elevator 11 is moving in a straight line, so that the control structure 10 is in its position shown in Fig. 2. When the corn harvesting machine is turned to the right the control structure 10 is moved to its position shown in Fig. 5 in which the harvesting machine is designated generally at 41. As the harvesting machine 41 is turned to the right as shown in Fig. 5, the elevator 11 is swung to the left since it is rigidly attached to the rear end of the harvesting machine 41. This action pivotally moves the telescopic unit 22 counterclockwise as viewed in Fig. 5 in a horizontal plane about the pin 23. The angular movement of the telescopic unit 22 is transmitted through the bolt 28 and shaft 29 to effect a counterclockwise rotation of control rod 34, as viewed in Figs. 2 and 5. This rotational movement of the control rod 34 pulls on the flexible member 36 to thereby move the rear end of the discharge hood 18 to the right to direct corn from the elevator 11 into the wagon 17. It will thus be apparent that because of the structural relation of the telescopic unit 22 and the control rod 34, a pivotal movement of the telescopic unit 22 through a given angle results in a rotational movement of the control rod 34 through a corresponding angle. Thus since the movement of the control rod 34 controls the movement of the discharge hood 18, the degree of movement of the hood 18 is dependent on the degree of movement of the telescopic unit 22 which in turn is governed by the angle of turn of the harvesting machine 41. Stated otherwise, the greater the angle of turn of the harvesting machine 41, the greater the angle through which the discharge hood 18 is moved to thereby insure that the contents of the elevator 11 are directed into the wagon 17.

It can readily be seen that on turning of the harvesting machine 41 to the left, the elevator 11 will be swung to the right and the discharge hood 18 will in turn be swung to the left to maintain it over the top of the wagon 17. Thus on any turning of the machine 41, the discharge hood 18 will be swung in the same direction as the direction in which the machine is turned to thereby direct the contents of the elevator 11 into the wagon 17 rather than onto the ground which would be the case if the control structure 10 of this invention were not provided. The telescopic unit 22 insures that a rough terrain will not interfere with the swinging action of the discharge hood 18 since the wagon 17 is free to move up and down without affecting the actuating action of the telescopic unit 22 on the shaft 29.

Although the invention has been described with respect to a preferred embodiment thereof, it is to be understood that it is not to be so limited since changes can be made therein which are within the full intended scope of this invention as defined by the appended claim.

I claim:

For use with a harvesting machine having a fixedly mounted upwardly and rearwardly inclined elevator with a horizontally movable discharge hood, and a wagon connected by a draft member to said machine in a trailing relation, means for moving said discharge hood to maintain the same above said wagon during a turning movement of said machine comprising an upright shaft adapted to be rotatably connected to an upright side of said elevator, a bar member attached intermediate its ends to the top end of said shaft, a telescopic unit pivoted at one of its ends to the bottom end of said shaft for up and down swinging movement relative to said shaft, said telescopic unit adapted to have its opposite end pivotally attached to said wagon for horizontal swinging movement relative thereto, and a pair of flexible members having one of their ends attached to the ends of said bar member and their opposite ends adapted to be connected to opposite sides of said discharge hood.

References Cited in the file of this patent
UNITED STATES PATENTS

| | | |
|---|---|---|
| 1,306,462 | Bergerud | June 10, 1919 |
| 1,798,231 | Thiemann | Mar. 31, 1931 |
| 2,377,760 | Court | June 5, 1945 |
| 2,465,156 | Huddle | Mar. 22, 1949 |
| 2,496,472 | Huddle | Feb. 7, 1950 |
| 2,608,310 | De Penning | Aug. 26, 1952 |